(12) United States Patent
Parnin et al.

(10) Patent No.: US 8,051,869 B2
(45) Date of Patent: Nov. 8, 2011

(54) GRAVITY OPERATED VALVE

(75) Inventors: Francis Parnin, Suffield, CT (US); Enzo DiBenedetto, Torrington, CT (US)

(73) Assignee: United Technologies Corporation, Hartford, CT (US)

( * ) Notice: Subject to any disclaimer, the term of this patent is extended or adjusted under 35 U.S.C. 154(b) by 383 days.

(21) Appl. No.: 12/470,903

(22) Filed: May 22, 2009

(65) Prior Publication Data

US 2010/0294371 A1 Nov. 25, 2010

(51) Int. Cl.
*F16K 17/36* (2006.01)
(52) U.S. Cl. .............. 137/1; 137/38; 137/533; 137/597
(58) Field of Classification Search .............. 137/1, 38, 137/44, 532, 533, 597
See application file for complete search history.

(56) References Cited

U.S. PATENT DOCUMENTS

| | | | |
|---|---|---|---|
| 1,871,055 A | 8/1932 | Hasbrouck | |
| 2,239,098 A | 4/1941 | Hunter | |
| 2,324,464 A | 7/1943 | Parker | |
| 2,494,209 A | 1/1950 | Sikorsky | |
| 2,830,668 A | 4/1958 | Gaubis et al. | |
| 2,831,490 A | 4/1958 | Simcock | |
| 2,984,975 A | 5/1961 | Rodgers et al. | |
| 4,117,907 A | 10/1978 | Lechler | |
| 4,153,141 A | 5/1979 | Methlie | |
| 4,252,140 A | 2/1981 | Hildebrandt | |
| 4,309,870 A | 1/1982 | Guest et al. | |
| 4,367,638 A | 1/1983 | Gray | |
| 4,669,893 A | 6/1987 | Chalaire et al. | |
| 4,782,658 A | 11/1988 | Perry | |
| 4,813,445 A | 3/1989 | Lu | |
| 4,947,639 A | 8/1990 | Hibner et al. | |
| 4,974,410 A | 12/1990 | Wright et al. | |
| 4,983,051 A | 1/1991 | Hibner et al. | |
| 5,107,676 A | 4/1992 | Hadaway et al. | |
| 5,110,257 A | 5/1992 | Hibner et al. | |
| 5,121,598 A | 6/1992 | Butler | |
| 5,344,239 A | 9/1994 | Stallone et al. | |
| 5,433,674 A | 7/1995 | Sheridan et al. | |
| 5,472,383 A | 12/1995 | McKibbin | |
| 5,590,736 A | 1/1997 | Morris et al. | |
| 5,911,678 A | 6/1999 | White | |
| 6,223,616 B1 | 5/2001 | Sheridan | |
| 6,267,147 B1 | 7/2001 | Rago | |
| 6,793,042 B2 | 9/2004 | Brouillet | |
| 7,118,336 B2 | 10/2006 | Waddleton | |
| 7,431,043 B2 * | 10/2008 | Xiang et al. ............... 137/597 |
| 7,530,430 B2 * | 5/2009 | Hoang et al. ............... 137/38 |
| 7,712,317 B2 | 5/2010 | Scanlon | |
| 2008/0063333 A1 | 3/2008 | Bruno et al. | |

OTHER PUBLICATIONS

Extra-Flugzeugbau GmbH, Service Manual Extra 300, Chapter 79 -Oil System, page date: Jan. 31, 1995, pp. 1-12.

* cited by examiner

*Primary Examiner* — Kevin Lee
(74) *Attorney, Agent, or Firm* — Kinney & Lange, P.A.

(57) ABSTRACT

A valve includes a valve body defining a valve cavity. The valve body has first and second inlet ports, an outlet port, and a dump port. A weighted member is positioned in the valve cavity and is movable between first and second positions. In the first position, the first inlet port is fluidically connected to the outlet port and the second inlet port is fluidically connected to the dump port. In the second position, the second inlet port and the dump port are fluidically connected to the outlet port.

20 Claims, 6 Drawing Sheets

GRAVITY OPERATED VALVE

CROSS-REFERENCE TO RELATED APPLICATIONS

Reference is made to application Ser. No. 12/470,823 entitled "WINDMILL AND ZERO GRAVITY LUBRICATION SYSTEM" and application Ser. No. 12/470,875 entitled "APPARATUS AND METHOD FOR PROVIDING DAMPER LIQUID IN A GAS TURBINE ENGINE" which are filed on even date and are assigned to the same assignee as this application, the disclosures of which are incorporated by reference in their entirety.

Reference is also made to application Ser. No. 12/393,743 entitled "AUXILIARY PUMP SYSTEM FOR FAN DRIVE GEAR SYSTEM",filed on Feb. 26, 2009 by William G. Sheridan and is assigned to the same assignee as this application, the disclosures of which are incorporated by reference in their entirety.

BACKGROUND

The present invention relates to valves, and more particularly, to valves actuated by gravity for use in gas turbine engine lubrication systems.

In many gas turbine engines, a low pressure spool includes a low pressure turbine connected to and driving a low pressure compressor, and a high pressure spool includes a high pressure turbine connected to and driving a high pressure compressor. A main pump is typically driven by the high pressure spool, connected through gearing, and is used to pump lubricating and cooling liquid to all engine components that require lubrication and cooling.

The main pump typically pumps liquid from a passage connected to a main reservoir that holds both liquid and air. During normal operating conditions, the liquid settles at the bottom of the main reservoir and displaces air to the top. However, in a gas turbine engine mounted on an aircraft, the main reservoir may experience reduced gravitational forces or "negative gravity" conditions such as the aircraft turning upside down, the aircraft accelerating toward the Earth at a rate equal to or greater than the rate of gravity, or the aircraft decelerating at the end of a vertical ascent. Under negative gravity conditions, the liquid in the main reservoir can rise to the top, which can expose an opening of the passage to air and interrupt the supply of liquid to the main pump and, consequently, interrupt supply to the engine components. Certain engine components, such as gears and bearings, can be damaged by a relatively short period of non-lubricated operation during negative gravity conditions.

In some gas turbine engines, a fan at the front of the engine is connected to the low pressure spool through a fan drive gear system. When the high pressure spool stops rotating or rotates at a reduced rpm (revolutions per minute), the fan drive gear system can continue rotating even though the main pump will ordinarily provide little or no liquid during this time. For example, wind may rotate the fan and corresponding gears and bearings while the aircraft is parked on the ground or during an in-flight engine shutdown. Certain gears and bearings can also be damaged by a relatively short period of non-lubricated operation during windmilling as well.

SUMMARY

According to the present invention, a valve includes a valve body defining a valve cavity. The valve body has first and second inlet ports, an outlet port, and a dump port. A weighted member is positioned in the valve cavity and is movable between first and second positions. In the first position, the first inlet port is fluidically connected to the outlet port and the second inlet port is fluidically connected to the dump port. In the second position, the second inlet port and the dump port are fluidically connected to the outlet port.

Another embodiment includes a method of operating a valve. The method includes flowing fluid from a first inlet port to an outlet port and from a second inlet port to a dump port when the valve experiences gravitational forces exceeding a threshold, and flowing fluid from the second inlet port and from the dump port to the outlet port when the valve experiences gravitational forces less than the threshold.

Yet another embodiment includes a method of operating a valve having a valve body and a weighted member. The method includes flowing fluid from a first inlet port to an outlet port and from a second inlet port to a dump port when the weighted member is in a first position with respect to the valve body, applying a pressure from the second inlet port tending to bias the weighted member toward a second position with respect to the valve body, and flowing fluid from the second inlet port to the outlet port when the weighted member is in the second position.

DETAILED DESCRIPTION

Figure 1:
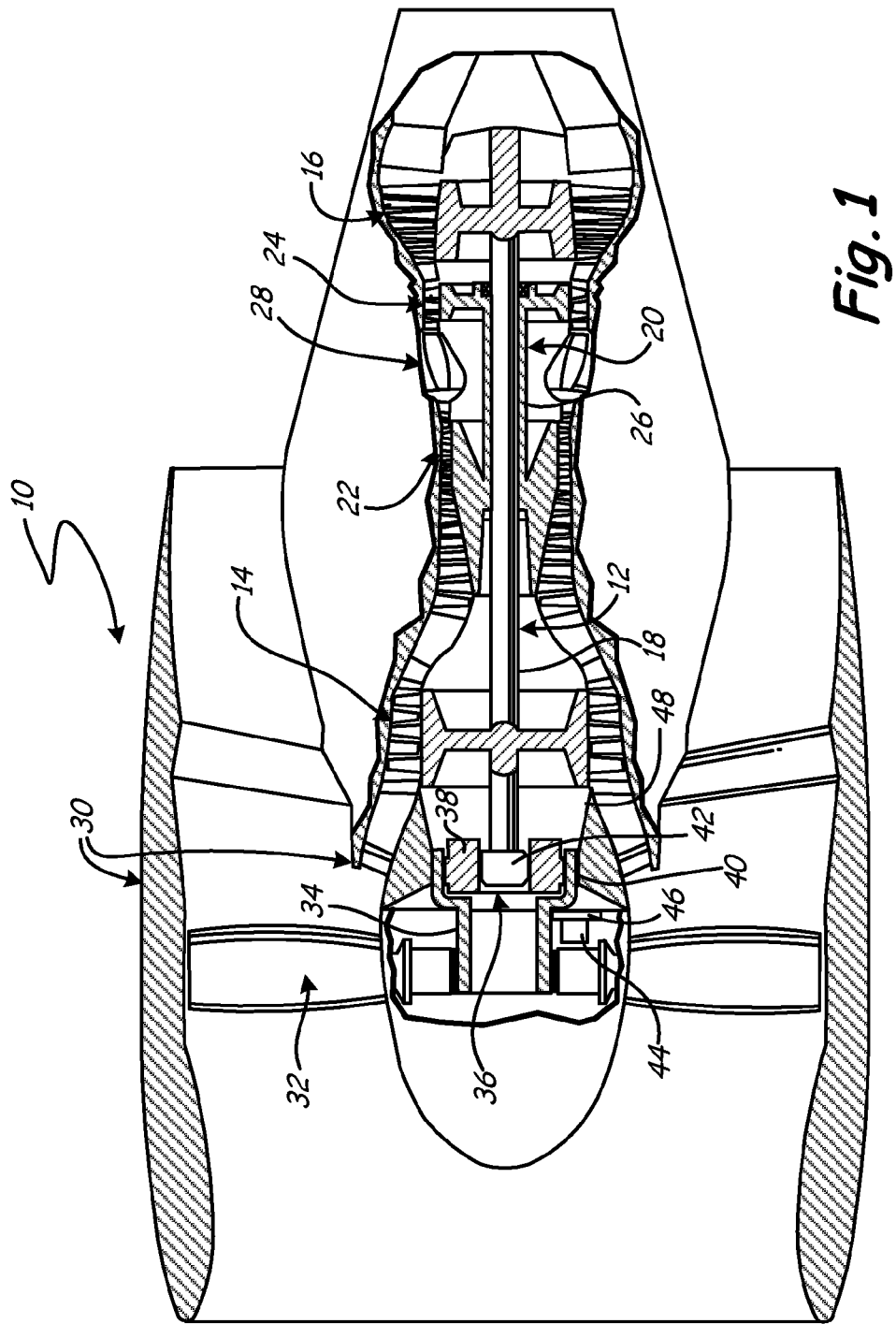
FIG. 1 is a schematic cross-sectional side view of a gas turbine engine with a fan drive gear system.

FIG. 1 is a schematic cross-sectional side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, nacelle 30, fan 32, fan shaft 34, and fan drive gear system 36 (which includes star gear 38, ring gear 40, and sun gear 42). The general construction and operation of gas turbine engines is well-known in the art, and therefore detailed discussion here is unnecessary. However, a more detailed understanding of fan drive gear system 36 can be helpful. As shown in FIG. 1, low pressure spool 12 is coupled to fan shaft 34 via fan drive gear system 36. In the illustrated embodiment, fan drive gear system 36 is a "star gear system". Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves about its axis, when sun gear 42 rotates. When low pressure spool 12 rotates, fan drive gear system 36 causes fan shaft 34 to rotate at a slower rotational velocity than that of low pressure spool 12. This allows fan 32 and low pressure spool 12 to rotate at different speeds for improved operation of both fan 32 and low pressure spool 12. In an alternative embodiment, fan drive gear system 36 can be a "planetary gear system". In a planetary gear system, ring gear 40 is fixed and fan shaft 34 is attached to a carrier (not shown) that carries star gear 38 (also called a planet gear). Star gear 38 orbits about sun gear 42 as it spins between sun gear 42 and ring gear 40.

Pump 44 is coupled to and is driven by fan shaft 34 via pump gear 46 such that pump 44 can operate whenever fan shaft 34 is rotating. Pump 44 supplies liquid, such as oil, to lubricate components such as gears and bearings of fan drive gear system 36. Fan drive gear system 36 benefits from a relatively continuous supply of lubricating liquid whenever fan shaft 34 is rotating. At least some of the liquid supplied to fan drive gear system 36 drains to sump 48 and is eventually pumped back through pump 44. In an alternative embodiment, pump 44 can be an electrically driven oil pump.

Figure 2:
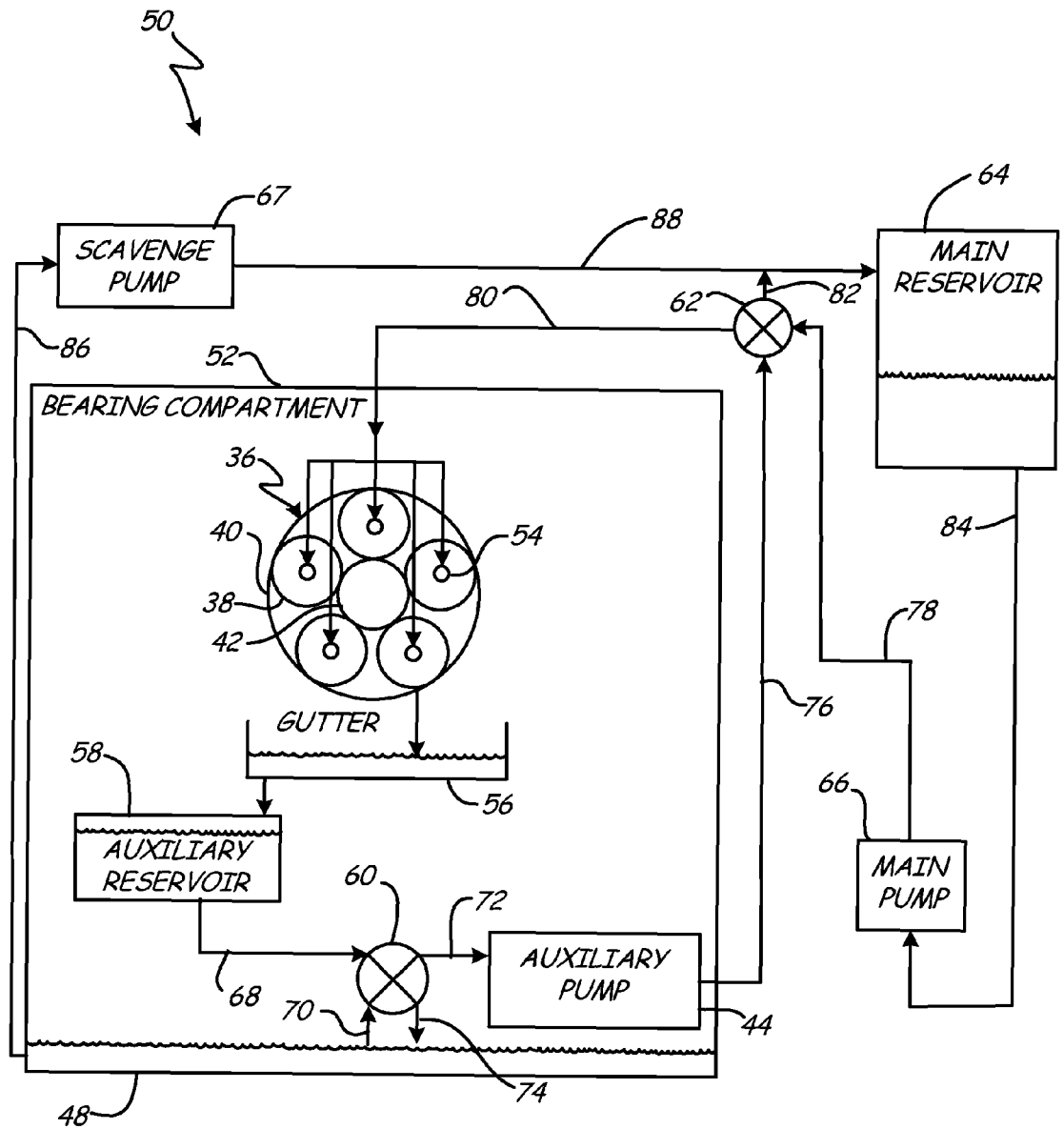
FIG. 2 is a schematic view of a pump system for use in the gas turbine engine of FIG. 1.

FIG. 2 is a schematic view of pump system 50. Pump system 50 includes bearing compartment 52 having a compartment cavity that contains fan drive gear system 36 (including bearings 54), auxiliary pump 44, gutter 56, auxiliary reservoir 58, and first shuttle valve 60. Pump system 50 also includes second shuttle valve 62, main reservoir 64, main pump 66, and scavenge pump 67 positioned outside of bearing compartment 52. Passages 68, 70, 72, 74, 76, 78, 80, 82, 84, 86, and 88 connect the various components as illustrated and as further described, below.

As fan drive gear system 36 spins, lubricating liquid drips or flies off fan drive gear system 36 into bearing compartment 52 in different directions. A portion of that liquid is caught and collected by gutter 56 and funneled to auxiliary reservoir 58. During normal operating conditions, auxiliary reservoir 58 is kept substantially full of liquid for later use. In one embodiment, auxiliary reservoir 58 contains enough liquid to provide adequate lubrication for fan drive gear system 36 for a specified amount of time. Gutter 56 does not collect all liquid leaving fan drive gear system 36. The remaining liquid that is not collected by gutter 56 falls to sump 48, which is an open-top reservoir at a bottom of bearing compartment 52. Bearing compartment 52 can be sealed to reduce liquid flow out of bearing compartment 52, except through designated passages as herein described.

Second shuttle valve 62 is fluidically connected to auxiliary pump 44 via passage 76, to main pump 66 via passage 78, to bearings 54 via passage 80, and to main reservoir 64 via passages 82 and 88. In the illustrated embodiment, passage 76 is an auxiliary supply passage and passage 78 is a main supply passage. Second shuttle valve 62 selectively directs fluid flow from auxiliary pump 44 or main pump 66 to bearings 54. Main reservoir 64 is further connected to main pump 66 through passage 84. Scavenge pump 67 is connected to sump 48 via passage 86 and to main reservoir 64 via passage 88. Scavenge pump 67 pumps a portion of the liquid in sump 48 to main reservoir 64 for use by main pump 66. (See application Ser. No. 12/470,823 entitled "WINDMILL AND ZERO GRAVITY LUBRICATION SYSTEM" filed on even date and assigned to the same assignee as this application for a more detailed description of the function of second shuttle valve 62).

First shuttle valve 60 is fluidically connected to auxiliary reservoir 58 via passage 68, to sump 48 via passage 70, to auxiliary pump 44 via passage 72, and again to sump 48 via passage 74. As part of pump system 50, first shuttle valve 60 and second shuttle valve 62 work together as a valve system. This valve system directs lubricating liquid to bearings 54 from one of sump 48, auxiliary reservoir 58, or main reservoir 64. When engine operating conditions prevent main pump 66 from supplying adequate liquid, second shuttle valve 62 switches from main pump 66 to auxiliary pump 44. Switching to auxiliary pump 44 can be beneficial if it has an adequate supply of liquid from first shuttle valve 60 during all gravity conditions.

First shuttle valve 60 is actuated by gravity to selectively direct fluid flow from auxiliary reservoir 58 or sump 48 to auxiliary pump 44. Actuation depends on whether gravitational forces are sensed to be above or below a threshold. Forces from the Earth's gravitational field do not, of course, actually change at a given location. Instead, the term "gravitational forces" as used herein refers to forces from the Earth's gravitational field combined with inertia to create what is sensed to be gravity conditions at a particular point in time by a particular object, such as first shuttle valve 60. For example, gravity conditions can be sensed to be ordinary, zero, or negative. Ordinary gravity conditions can occur when gravity is sensed to be positive, such as when gas turbine engine 10 is vertically upright and parked on the ground, flying level, ascending, or gradually descending. Negative and zero gravity conditions can occur when gravity is sensed to be approximately zero or negative, such as when gas turbine engine 10 is upside down, accelerating toward the Earth at a rate equal to or greater than the rate of gravity, or decelerating at the end of a vertical ascent. Ordinary gravity conditions include weighted member 92 experiencing gravitational forces greater a threshold that is equal to a value between about 0 and 1 times the force of standard gravity at sea level (also called "g-force", "$g_0$", or "gees"). In one embodiment, the threshold can be about 0 g. In another embodiment, the threshold can be a value greater than about 0 g but still less than 1 g.

Under zero and negative gravity conditions, liquid in sump 48 and main reservoir 64 can rise to their respective tops, interrupting supply to passages 70 and 84, respectively. On the other hand, auxiliary reservoir 58 is kept substantially full of lubricating liquid and is adapted to supply that liquid during negative gravity conditions. In one embodiment, however, auxiliary reservoir 58 only holds enough liquid to supply for a limited amount of time, as dictated by aircraft mission requirements. Auxiliary reservoir 58 does not capture liquid efficiently enough to supply the liquid for long durations. Thus, first shuttle valve 60 supplies liquid from sump 48 to auxiliary pump 44, under ordinary gravity conditions, which is most of the time. First shuttle valve 60 then switches and supplies from auxiliary reservoir 58 only for brief periods of zero or negative gravity.

Rotational speed of high pressure spool 20 is important because main pump 66 is driven by high pressure spool 20. If high pressure spool 20 rotates slower than operating speed or even stops, then main pump 66 will pump a reduced amount of liquid. In some situations, fan 32 can continue rotating at relatively high speeds when high pressure spool 20 rotates slowly or even stops. This can occur when gas turbine engine 10 is shut down but air still flows across fan 32, such as during an in-flight engine shut-down or when gas turbine engine 10 is on the ground and fan 32 is "windmilling". For these reasons, it can be important that first shuttle valve 60 supply fluid from sump 48 when gravitational forces are above a threshold and supply fluid from auxiliary reservoir 58 when gravitational forces are below a threshold.

Figure 3:
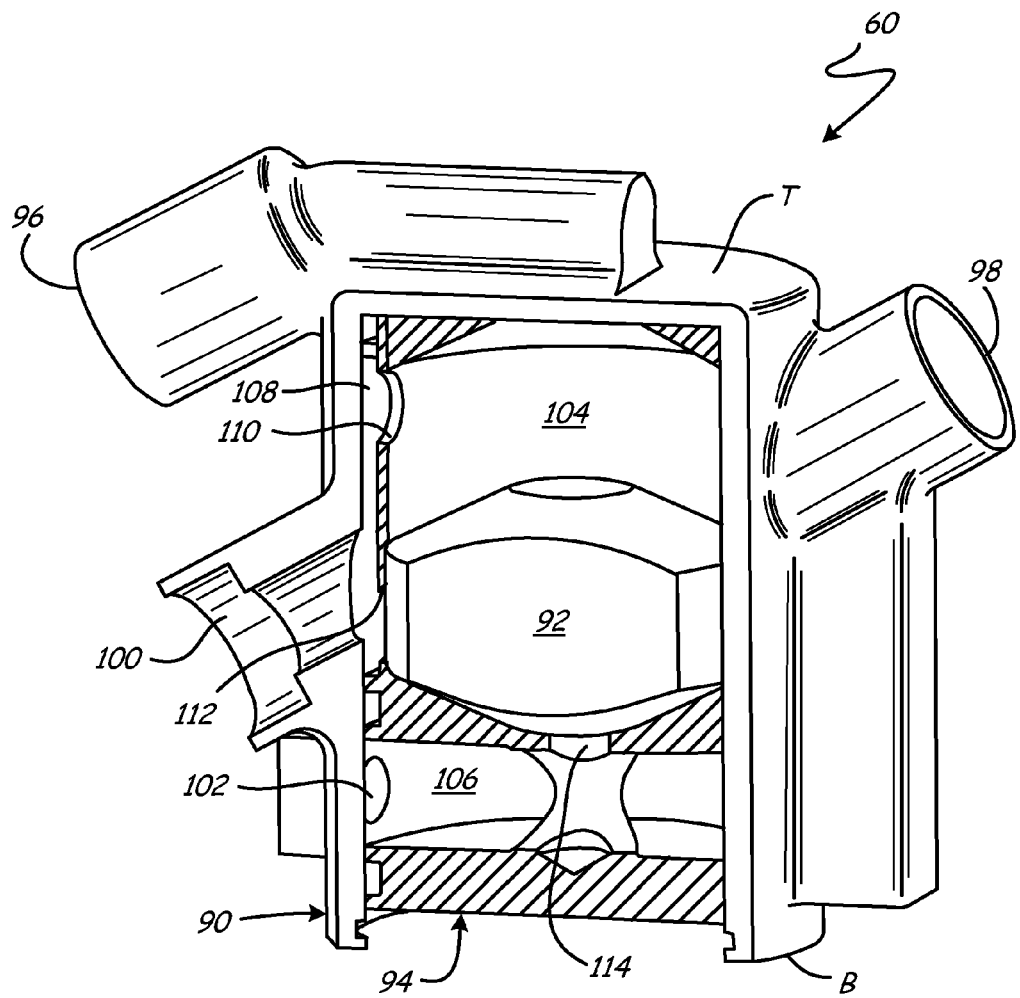
FIG. 3 is a sectional view of a gravity actuated shuttle valve for use in the pump system of FIG. 2.

FIG. 3 is a sectional view of first shuttle valve 60, which is positioned vertically upright with valve top T above valve bottom B. First shuttle valve 60 includes valve body 90, weighted member 92, and inner sleeve 94 positioned in-between. Valve body 90 has first and second inlet ports 96 and 98, outlet port 100, and dump port 102. Inner sleeve 94 is positioned in a cavity of valve body 90 and has its own main sub-cavity 104 and second or bottom sub-cavity 106. Side sub-cavity 108 is a space defined between inner sleeve 94 and valve body 90, adjacent and fluidically connected to outlet port 100. Main sub-cavity 104 is fluidically connected to side sub-cavity 108 via top and bottom sleeve side ports 110 and 112. Main sub-cavity 104 is fluidically connected to bottom sub-cavity 106 via sleeve sub-cavity port 114. Main sub-cavity 104 is also fluidically connected to first inlet port 96. Bottom sub-cavity 106 fluidically connects second inlet port 98 to dump port 102. Weighted member 92 is positioned inside main sub-cavity 104, slidable between first and second positions with respect to valve body 90. Weighted member 92 can be made of steel, tungsten carbide, or other material having a density sufficient for a given application. Weighted member 92 can be virtually any shape suitable for sliding inside main sub-cavity 104, such as a sphere or a cylinder.

When first shuttle valve 60 is used in pump system 50, it can be connected to the various passages as illustrated in FIG. 2. First inlet port 96 can be connected to passage 70 to receive fluid from sump 48. Second inlet port 98 can be connected to passage 68 to receive fluid from auxiliary reservoir 58. Outlet port 100 can be connected to passage 72 for supplying fluid to auxiliary pump 44. Dump port 102 can be connected to passage 72 to pass fluid to and from sump 48. In an alternative embodiment, passage 74 can be omitted and dump port 102 can pass fluid to and from bearing compartment 52. In a further alternative embodiment, a shield (not shown) can be positioned on dump port 102 such that fluid that passes to bearing compartment 52 from dump port 102 is directed toward sump 48 but does not actually extend all the way to sump 48. Operation of first shuttle valve 60 is described in greater detail with respect to FIGS. 4A-4C.

Figure 4A:
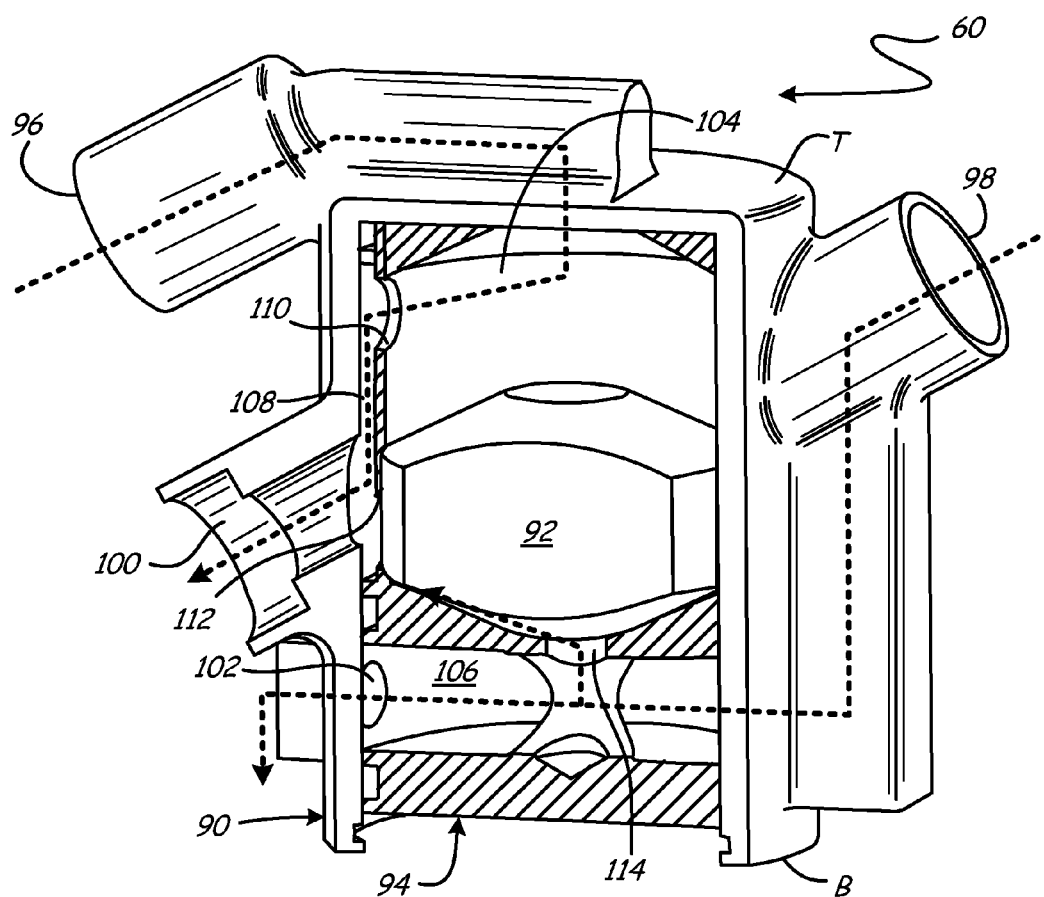
FIG. 4A is a sectional view of the valve of FIG. 3 in a first position.

FIG. 4A is a sectional view of first shuttle valve 60 in the first position. In the first position, weighted member 92 is positioned at a bottom of main sub-cavity 104, reducing flow through bottom sleeve side port 112 and sleeve sub-cavity port 114. Fluid entering at second inlet port 98 flows through bottom sub-cavity 106 and out dump port 102. A relatively small amount of fluid can flow through sleeve sub-cavity port 114, past weighted member 92. Fluid entering at first inlet port 96 flows through main sub-cavity 104, through top sleeve side port 110, through side sub cavity 108, and out outlet port 100.

Under ordinary gravity conditions, gravity acts on weighted member 92, pulling weighted member 92 down and holding it in the first position. Fluid flowing in second inlet port 98 creates a pressure in bottom sub-cavity 106, tending to bias weighted member 92 up. Despite this fluid pressure, weighted member 92 will be held in the first position so long as gravitational forces are greater than a threshold.

Figure 4B:
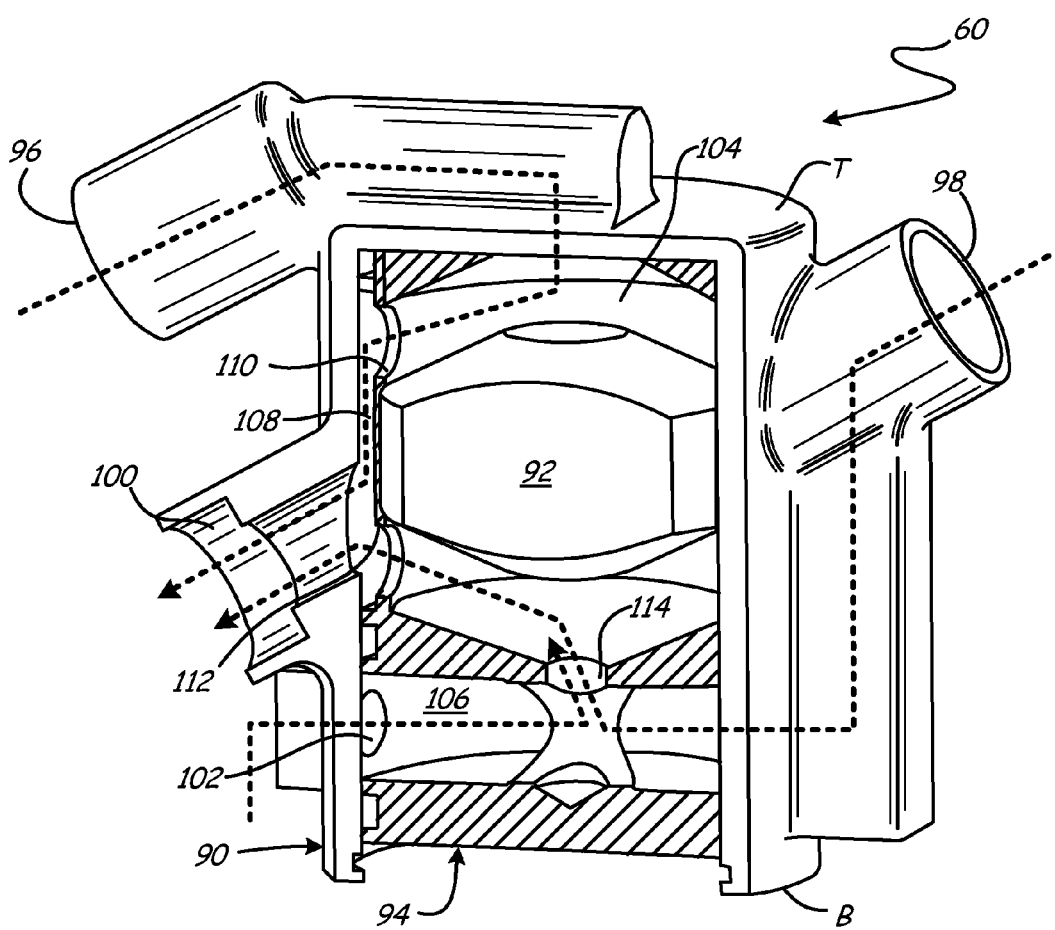
FIG. 4B is a sectional view of the valve of FIG. 3 between first and second positions.
Figure 4C:
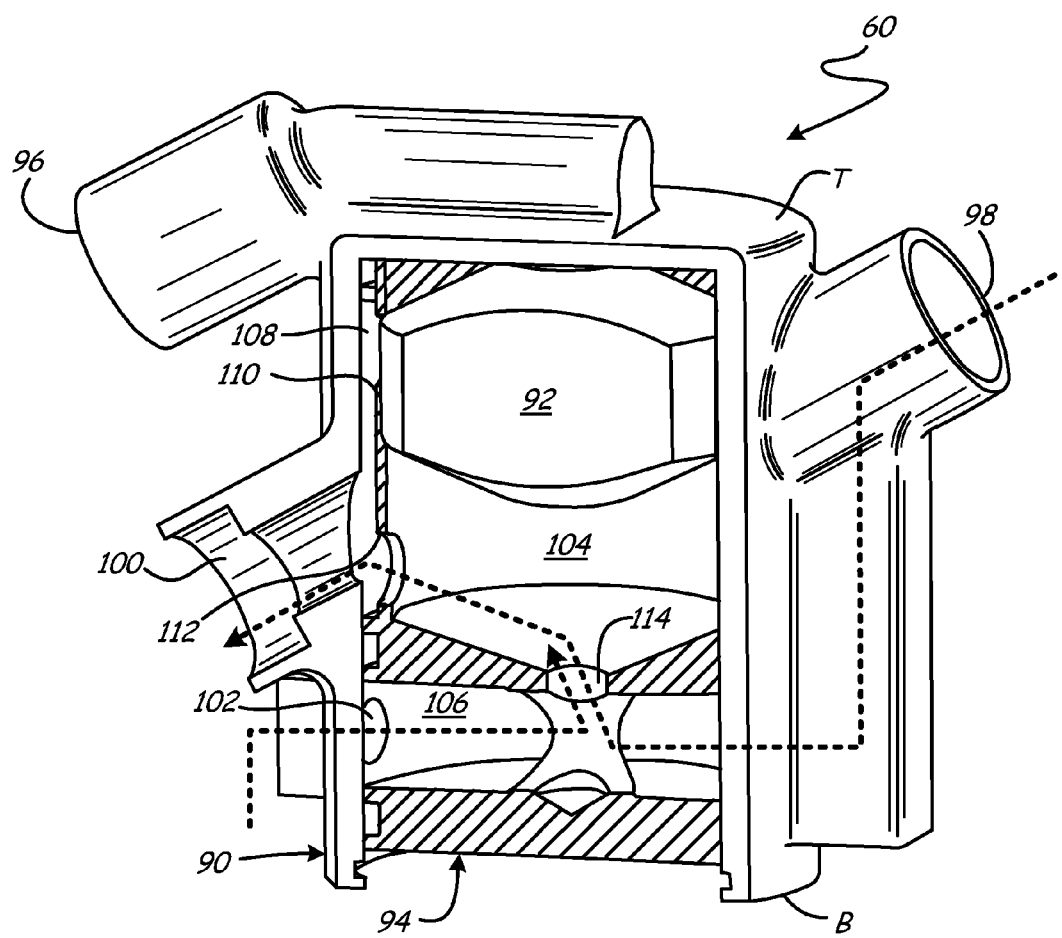
FIG. 4C is a sectional view of the valve of FIG. 3 in a second position.

FIG. 4B is a sectional view of first shuttle valve 60 with weighted member 92 between the first position and the second position (shown in FIG. 4C). When gravitational forces acting on weighted member 92 drop below the threshold, pressure in bottom sub-cavity 106 can begin moving weighted member 92 up from the first position. The threshold can be between 0 g and 1 g. If the pressure in bottom sub-cavity 106 is relatively strong, the threshold can be closer to 1 g. If the pressure in bottom sub-cavity 106 is less strong, the threshold can be closer to 0 g. In one embodiment, weighted member 92 can begin moving from the first position at a first threshold and can be fully transitioned to the second position by about a second threshold. The transition between first position and second position can be relatively brief, such as about 30 milliseconds.

When transitioning between the first position and the second position, fluid from first inlet port 96 still flows to outlet port 100. However, now fluid from second inlet port 98 flows in bottom sub-cavity 106, through sleeve sub-cavity port 114, through main sub-cavity 104, through bottom sleeve side port 112, through side sub-cavity 108, and out outlet port 100. If a pump such as auxiliary pump 44 creates a sufficiently low pressure area at outlet port 100, fluid from second inlet port 98 will no longer flow out dump port 102. Instead, fluid will enter dump port 102, mix with the fluid entering second inlet port 98, and flow out outlet port 100.

FIG. 4C is a sectional view of first shuttle valve 60 in the second position. In the second position, weighted member 92 is positioned at a top of main sub-cavity 104, reducing flow through first inlet port 96 and top sleeve side port 110. Fluid entering at second inlet port 98 and dump port 102 flow to outlet port 100 as illustrated. When gravitational forces increase above the threshold, weighted member 92 can move from the second position back to the first position (shown in FIG. 4A).

FIGS. 4A-4C show that first shuttle valve 60 is actuable between first and second positions to supply fluid from multiple sources. When first shuttle valve 60 is connected to a lubrication supply system such as pump system 50 (shown in FIG. 2), valve 60 can switch between sump 48 and auxiliary reservoir 58. When gravitational forces acting on weighted member 92 exceed a threshold, valve 60 supplies lubricating liquid from sump 48 to auxiliary pump 44. Also in the first position, excess fluid in auxiliary reservoir 58 can drain out dump port 102 to sump 48.

When gravitational forces acting on weighted member 92 are below the threshold, valve 60 supplies lubricating liquid from auxiliary reservoir 58 to auxiliary pump 44. Also in the second position, valve 60 can supply air from bearing compartment 52 through valve port 102 to auxiliary pump 44. Air bleeding in through valve port 102 can mix with and dilute lubricating liquid entering through second inlet port 98 to extend the length of time it takes auxiliary pump 44 to empty auxiliary reservoir 58. This extends the amount of time auxiliary reservoir 58 is able to supply lubricating liquid during zero and negative gravity conditions. Depending on the exact configuration of pump system 50, some lubricating liquid may enter valve port 102, in addition to air, to mix with the lubricating liquid entering from second inlet port 98.

It will be recognized that the present invention provides numerous benefits and advantages. First shuttle valve 60 can effectively switch between multiple inlet sources, actuated by gravity. This allows for pump system 50 to supply lubricating liquid to certain components during windmilling and during negative gravity conditions. Because of the size, weight, and configuration of first shuttle valve 60, it can be positioned conveniently in bearing compartment 52, reducing the need for additional valves and additional piping. This can reduce the overall weight of pump system 50, and consequently, gas turbine engine 10. First shuttle valve 60 can also be relatively reliable and low maintenance by virtue of having only a single moving piece.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, first shuttle valve 60 is not limited for use in pump system 50. Instead, first shuttle valve 60 can be used in virtually any system that benefits from a gravity actuated shuttle valve as configured in the present invention.

The invention claimed is:

1. A valve comprising:
   a valve body defining a valve cavity;
   first and second inlet ports, an outlet port, and a dump port each through the valve body; and
   a weighted member positioned in the valve cavity and movable between a first position wherein the first inlet port is fluidically connected to the outlet port and the second inlet port is fluidically connected to the dump port and a second position wherein the second inlet port and the dump port are fluidically connected to the outlet port.

2. The valve of claim 1, wherein the weighted member limits flow through the first inlet port in the second position.

3. The valve of claim 1, wherein the weighted member limits flow between the second inlet port and the outlet in the first position.

4. The valve of claim 1, wherein the valve has a valve top and a valve bottom, wherein the weighted member is positioned toward the valve bottom in the first position, and wherein the weighted member is positioned toward the valve top in the second position.

5. The valve of claim 1, wherein the weighted member is movable between the first and second positions in response to changes in gravitational forces.

6. The valve of claim 1, wherein the dump port has a smaller diameter than that of the first and second inlet ports and the outlet port.

7. The valve of claim 1, wherein first inlet port and the dump port are both fluidically connected to a sump of a gas turbine engine, the second inlet port is fluidically connected to an auxiliary reservoir, and the outlet port is fluidically connected to a lubricating liquid pump.

8. The valve of claim 1, wherein the weighted member comprises a material selected from the group consisting of steel and tungsten carbide.

9. The valve of claim 1, wherein the second inlet port is fluidically connected to the dump port during all positions of the weighted member.

10. The valve of claim 1, and further comprising:
    an inner sleeve positioned inside the valve cavity between the valve body and the weighted member.

11. The valve of claim 10, wherein the inner sleeve comprises:
    a main sub-cavity containing the weighted member;
    a second sub-cavity connecting the second inlet port to the dump port; and
    a sub-cavity port connecting the main sub-cavity to the second sub-cavity when the weighted member is in the second position.

12. A method of operating a valve, the method comprising:
    flowing fluid from a first inlet port to an outlet port and from a second inlet port to a dump port when the valve experiences gravitational forces exceeding a threshold; and
    flowing fluid from the second inlet port and from the dump port to the outlet port when the valve experiences gravitational forces less that the threshold.

13. The method of claim 12, wherein the valve includes a valve body and a weighted member, wherein the weighted member is in a first position with respect to the valve body when the valve experiences gravitational forces exceeding a threshold, and wherein the weighted member is in a second position with respect to the valve body when the valve experiences gravitational forces less that the threshold.

14. The method of claim 13, wherein the threshold is greater than 0 g and less than 1 g.

15. The method of claim 13, and further comprising:
    flowing fluid from each of the first inlet port, the second inlet port, and the dump port to the outlet port when the weighted member is between the first and second positions.

16. The method of claim 12, and further comprising:
    supplying lubricating liquid from a sump to the first inlet port;
    supplying lubricating liquid from an auxiliary reservoir to the second inlet port; and
    pumping lubricating liquid from the outlet port to a bearing of a gas turbine engine.

17. The method of claim 12, wherein the fluid flowed from the dump port to the outlet port includes air bled in through the dump port when the valve experiences gravitational forces less that the threshold.

18. A method of operating a valve having a valve body and a weighted member, the method comprising:
    flowing fluid from a first inlet port to an outlet port and from a second inlet port to a dump port when the weighted member is in a first position with respect to the valve body;
    applying a pressure from the second inlet port tending to bias the weighted member toward a second position with respect to the valve body; and
    flowing fluid from the second inlet port to the outlet port when the weighted member is in the second position.

19. The method of claim 18, wherein the weighted member moves from the first position to the second position when the weighted member experiences gravitational forces less than a threshold.

20. The method of claim 19, wherein the threshold has a value greater than zero gravity.

* * * * *